Oct. 5, 1926.
G. W. FERNSTRÖM
1,602,350
BALL RETAINER FOR BALL BEARINGS AND METHOD OF MAKING THE SAME
Filed June 9, 1923
2 Sheets-Sheet 2
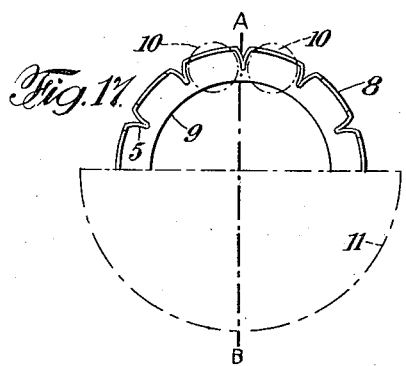
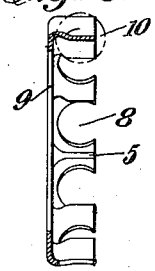
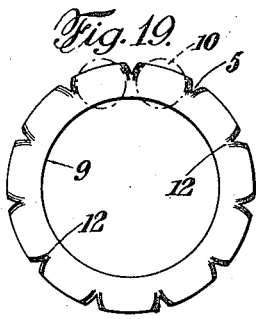
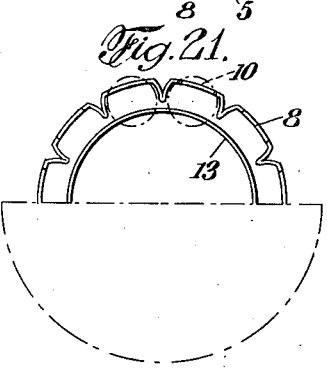
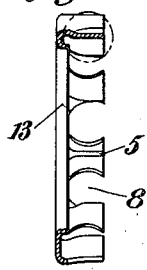
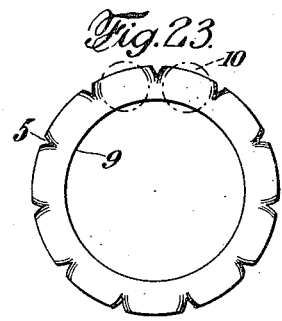
Inventor
Gustav W. Fernström
By his Attorneys
Rogers, Kennedy & Campbell Patented Oct. 5, 1926.

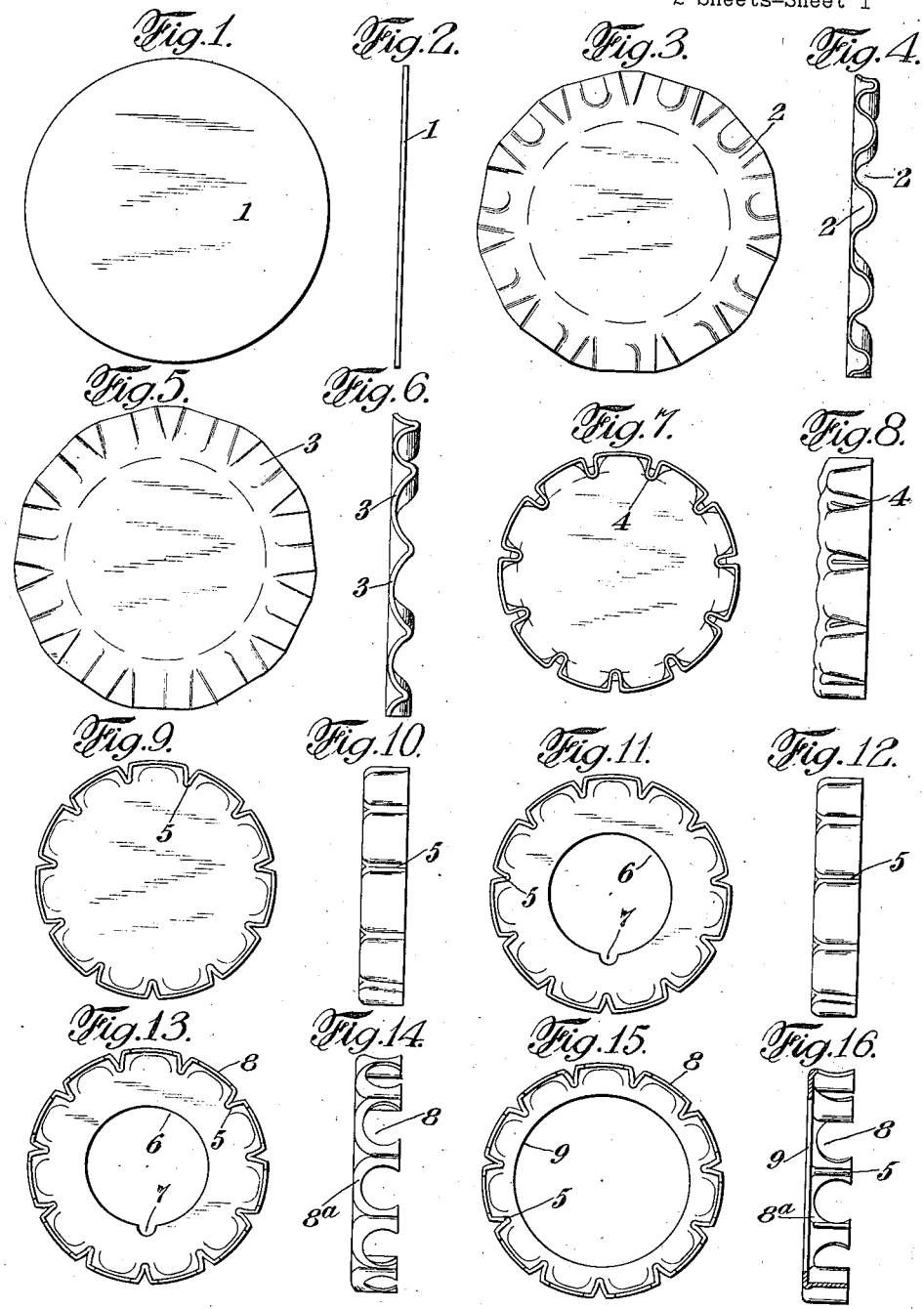

1,602,350

UNITED STATES PATENT OFFICE.

GUSTAV WALLENTIN FERNSTRÖM, OF GOTTENBORG, SWEDEN, ASSIGNOR TO AKTIEBOLAGET SVENSKA KULLAGERFABRIKEN, A CORPORATION OF SWEDEN.

BALL RETAINER FOR BALL BEARINGS AND METHOD OF MAKING THE SAME.

Application filed June 9, 1923, Serial No. 644,340, and in Sweden January 19, 1923.

This invention relates to sheet metal retainers for anti-friction bearings especially for use in ball bearings. An object of the invention is to provide a rigid sheet metal retainer of the type which is particularly adapted for use on the individual rows of two row ball bearings wherein the cage and balls are assembled with the inner ring of the bearing. The retainer constructed according to my invention is, on account of its strength and stiffness, well adapted to be used for the broader types of bearings hitherto usually equipped with bored solid retainers. It consists essentially of a flat ring having V-shaped partitions formed integrally therewith, the fold or groove between the shanks or wings of such a shaped partition extending substantially from points inside the outer circumference of the structure.

The invention not only relates to the retainer as an article of manufacture, but also to the method of manufacturing the same as hereafter more particularly described.

In the drawings, three different forms of retainers according to the invention are illustrated by way of example. Figs. 1 to 16, inclusive, show plan and side views of eight different steps or stages in the manufacture of one form of embodiment of the ball retainer. Figs. 17 to 20 show the finished retainer, the product of these operations viewed from the front side, in section, from the rear side, and from the edge respectively, and Figs. 21 to 24, inclusive, show, in the same manner, a second form of embodiment.

In manufacturing the preferred form of the invention, the following method of proceeding has been found satisfactory in practice. First, a round disc, 1 (Figs. 1 and 2), is stamped out, it being then folded at its circumference so as to obtain the form shown at 2 in Figs. 3 and 4. By a subsequent sharper folding, the impressions at the edge of the disc are made deeper so as to appear as a series of arcs or corrugations, 3 (Figs. 5 and 6). Thereupon, the blank is drawn or pressed in a mould so that it obtains the form of a box, whereby the corrugations previously formed are contracted so as to form folds, as shown at 4 in Figs. 7 and 8. By a succeeding drawing or pressing, the folds are made sharper, as shown at 5 in Fig. 9. In the blank thus formed a central hole, 6, (Fig. 11) is cut out, the metal bordering the hole having at one place a notch, 7, to enable an accurate fixing in position for indexing the blank and cutting the holes or cavities for the balls. These holes, 8, (Figs. 13 and 14) are cut one after the other, while indexing the blank in some suitable machine. Finally, the central hole is enlarged by a cutting operation so that the retainer obtains the finished appearance shown in Figs. 15 and 16, the edge of the hole being denoted by 9. Fig. 17 shows the finished retainer with two balls, 10, marked in position. The dashed and dotted line 11 shows the approximate size of the original disc, as compared with the finished retainer. Fig. 18 is a section, on line A—B of Fig. 17. Figs. 19 and 20 show the finished retainer viewed from the rear side and edgewise, respectively.

In using the retainer for double row ball bearings, two retainers are preferably placed with their rear or ring sides bearing on each other.

The retainer has proved itself to be very satisfactory as being made entirely integral and, therefore, simple in manufacturing and durable in use. Moreover, the retainer permits the balls to be placed close together, as shown in Fig. 17, the wing-shaped partitions entering between the balls being comparatively narrow at the apex 5. Nevertheless, the wings or partitions are very strong, owing to the fact that the fold or notch between the shanks or wings of each partition wall extend from points inside the outer circumference of the retainer, as shown at 12 in Fig. 19. In drawing or pressing the blank to a box-like shape, the surplus material is used to form the partition walls, which has the effect that the material of the walls will not be strained. The material is thus utilized to the fullest extent since the portions which would otherwise be removed are thus utilized for the forming of strong double partitions.

The retainer shown in Figs. 21 to 24 differs from that above described only in the flat part of the retainer (i. e. the remaining part of the bottom of the box-like blank) having been bent at its inner edge, as shown at 13, in Fig. 22, for still further stiffening the retainer.

It will be observed that due to the formation of the partitions by drawing or bending up the edge of the blank with the arc shaped impressions or corrugations, and due to the subsequent cutting out of the portions between the partitions to form the holes for the balls, the partitions will have a strong and firm integral connection at their bases with the flat ring-like body of the blank, it being noted that the bottoms of the holes 8 terminate some distance short of the plane of the ring, whereby portions 8a are left which extend axially from and are integral with the ring and which connect the adjacent wings of adjacent partitions with each other as shown in Figs. 14 and 16. These connecting portions 8a serve to greatly strengthen and stiffen the flat ring-like body portion, and to prevent the same from being bent or deformed in the use of the retainer in practice.

I claim as my invention:—

1. A method of manufacturing ball retainers for ball bearings, consisting in first folding a disc at its edge, then drawing or pressing it to the shape of a box, the surplus material being thereby utilized in forming V-shaped partitions, and excising the metal between the partitions to form cavities for the balls.

2. A sheet metal ball retainer for radial and ball bearings, comprising a body portion adapted to lie laterally of a row of balls, and folded partitions carried by the body, such partitions being V-shaped in cross section and being constructed to separate two adjacent balls, with the apexes of the partitions at or adjacent the pitch circle of the row of balls.

3. A sheet metal ball retainer characterized by a flat ring-like body having partitions of substantially V-shape in cross section extending axially therefrom at intervals to serve as separators for the balls, and portions extending axially from the ring between the partitions and serving to integrally connect adjacent partitions together.

4. A sheet metal ball retainer for ball bearings, said retainer comprising a ring-like body portion, and partitions extending axially therefrom to serve as separators for the balls, the said partitions being substantially V-shaped in cross section and being spaced from each other by circumferentially extending connecting portions formed with ball holding cavities.

5. A sheet metal ball retainer for ball bearings, said retainer comprising a ring-like body portion, and partitions extending axially therefrom to serve as separators for the balls, said partitions being substantially V-shaped in cross section and being spaced from each other by circumferentially extending connecting portions formed with ball receiving cavities, the bottoms of which terminate short of the plane of the body portion.

6. The method of making ball retainers for ball bearings, which method consists in providing a disc-like blank, deforming the edge of the blank to form radial corrugations therein, drawing up the corrugated edge axially of the blank and folding the corrugations to form axially extending ball separating partitions, and excising the metal between said partitions to form cavities for the balls.

7. The method of making ball retainers for ball bearings, which method consists in providing a disc-like blank, deforming the edge of said blank to form radial corrugations therein, drawing up the corrugated edge axially of the blank and forming folds extending axially at intervals to constitute ball separating partitions, and cutting out the material between the folds to form cavities for the balls.

In testimony whereof, I have affixed my signature hereto.

GUSTAV WALLENTIN FERNSTRÖM.